United States Patent [19]
Chiu et al.

[11] Patent Number: 5,991,150
[45] Date of Patent: Nov. 23, 1999

[54] SELF DEPLOYING MAGNIFIER FOR A PORTABLE COMPUTER DISPLAY SCREEN

[75] Inventors: George Liang-Tai Chiu, Cross River; Thomas Mario Cipolla; Fuad Elias Doany, both of Katonah; John Peter Karidis, Ossining, all of N.Y.; Rama Nand Singh, Bethel, Conn.

[73] Assignee: International Business Machines Corporation, Armonk, N.Y.

[21] Appl. No.: 08/926,176

[22] Filed: Sep. 9, 1997

[51] Int. Cl.$^6$ .................................. G06F 1/16; H05K 7/16
[52] U.S. Cl. ........................... 361/681; 359/742; 359/817
[58] Field of Search ..................................... 361/681, 682; 348/917; 34/903, 905; 359/742, 809, 811

[56] References Cited

U.S. PATENT DOCUMENTS 4,958,907  9/1990  Davis ........................................ 359/809

Primary Examiner—Leo P. Picard
Assistant Examiner—John D. Reed
Attorney, Agent, or Firm—Daniel P. Morris; Alvin J. Riddles

[57] ABSTRACT

The invention makes the size of the apparent image of the display screen of the display screen larger than the real size. A flat optical magnifier such as a lens of the fresnel type is positioned in an optically enhancing location between the operator and the display screen so that the apparent image at the operator side of the magnifier is greater than the actual image that is present on the display screen. A mechanism is provided for a notebook type portable computer that is passive to a user, folds into the case when the display screen closes over the keyboard and positions a fresnel lens, coplanar with and at a fixed distance from the display screen, when the notebook computer is opened and remains at that fixed distance as the display screen moves to maximum travel.

5 Claims, 5 Drawing Sheets

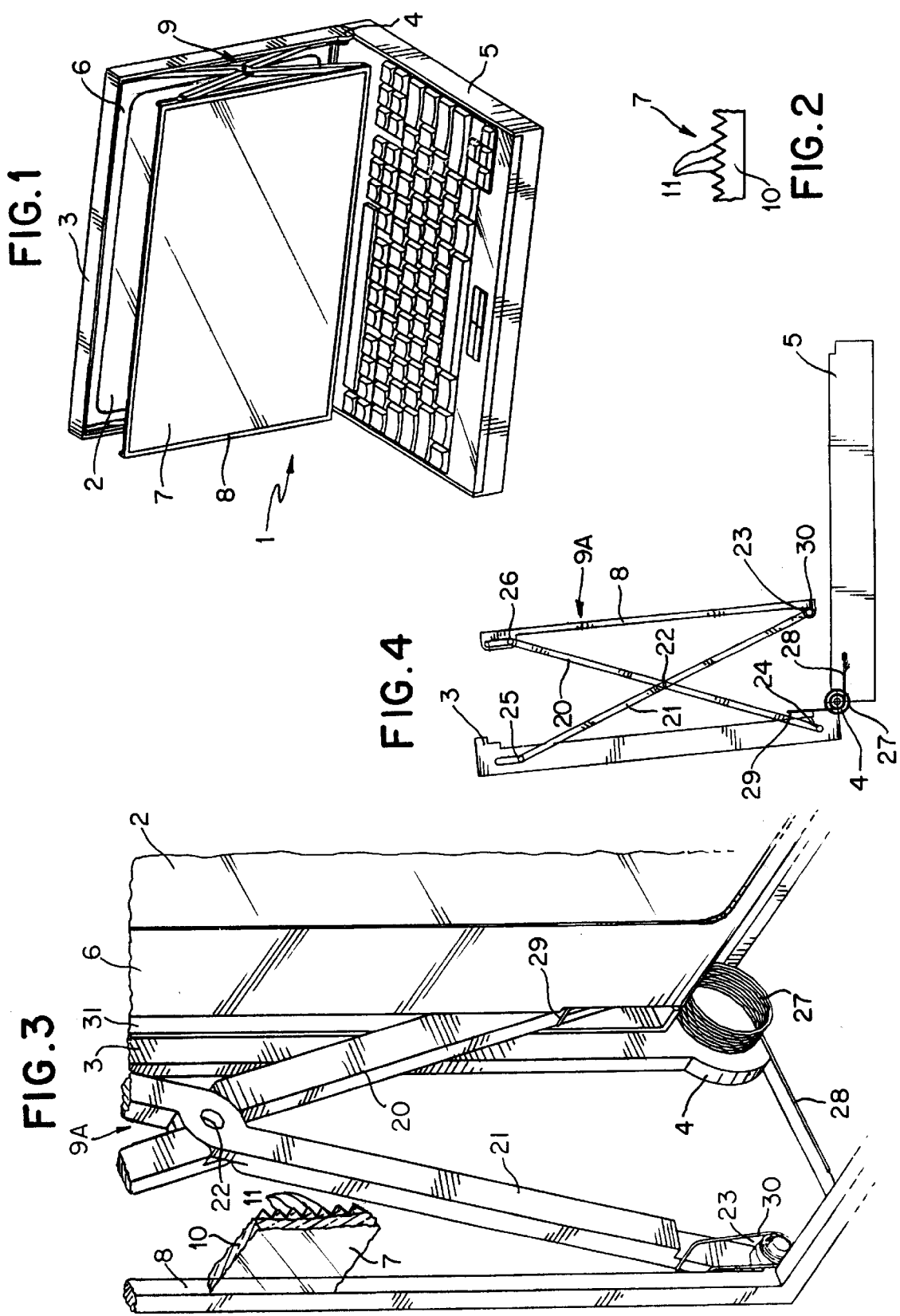

SELF DEPLOYING MAGNIFIER FOR A PORTABLE COMPUTER DISPLAY SCREEN

FIELD OF THE INVENTION

The invention relates to portable computer display screens and in particular to a magnifier for a portable computer display screen.

BACKGROUND OF THE INVENTION AND RELATION TO THE PRIOR ART

In the development of computers, particularly of the types known in the art as laptop or notebooks efforts have been directed to providing as much computational capability as possible in as small and as light weight a package. The most efficient and physically rugged universal package that has evolved in the art is one in which the display screen portion is hinged on the portion of the keyboard away from the user; so that it can be positioned essentially vertical with respect to the keyboard when in use and can be folded down over the keyboard when not in use. With such a structure the area of the display screen is limited by the area dimensions of the overall package so that efficient use of every portion of the display screen will be taking on increasing importance.

Around the periphery of the display screen there is a border that takes up some of the area. Efforts to minimize the area occupied by the border around the display screen are somewhat limited in flexibility by the many stringent considerations associated with the liquid crystal display (LCD) technology employed in the display screens in these types of computers.

A developing problem in the portable computer art is that progress in display screens of the LCD type is approaching the point where the size of a quality display screen can become greater than the size usually considered for a portable computer. It will be of advantage in this art to be able to take advantage of size progress as it becomes available.

SUMMARY OF THE INVENTION

The invention reduces dimensional constraints on a portable computer by making the size of the apparent image of the display screen of the portable computer larger than the real size. The invention positions a flat optical magnifier such as a lens of the fresnel type in an optically enhancing position between the operator of the portable computer and the display screen so that the image at the computer operator side of the lens is greater than that present on the display screen. A mechanism is provided for a notebook type portable computer that is passive to a user, folds into the case when the display screen closes over the keyboard and positions a fresnel lens, coplanar with the display screen, when the notebook computer is opened.

BRIEF DESCRIPTION OF THE DRAWINGS

FIG. 1 is a perspective view of the magnifier for a display screen of the invention mounted in a notebook, type computer.

FIG. 2 is side view of a fresnel lens type planar magnification member.

FIG. 3 is a larger scale perspective view illustrating relative positioning of the magnifier and display screen.

FIG. 4 is a schematic side view of the parts and their relative positioning for the magnifier mechanism.

FIGS. 8–12 are side views illustrating progressive positions of the magnifier mounting mechanism from completely closed to beyond fully open; wherein:

FIG. 8 illustrates the fit of the collapsed mounting mechanism and lens within the cover of the notebook computer.

FIG. 9 illustrates the mounting mechanism and lens position when the cover is opened to about 45 degrees.

FIG. 10 illustrates the mounting mechanism and lens position when the cover is opened to about 75 degrees.

FIG. 11 illustrates the mounting mechanism and lens deployment when the cover is opened to about 84 degrees.

FIG. 12 illustrates the mounting mechanism and lens deployment with coplanarity when the cover is further fully opened to about 105 degrees.

DESCRIPTION OF THE INVENTION

The invention reduces dimensional constraints on a portable computer by optically making the size of an apparent image of the display screen of the portable computer different than the real size. The ability to have a different apparent display screen image provided by the invention relaxes display technology constraints affecting packaging of the portable computer. The invention description uses as an illustration the providing of a larger apparent image to avoid a reduction in available image area that is the result of a border region around the periphery needed for liquid crystal display technology.

In the invention a relatively flat magnifying member such as a relatively flat lens of the fresnel type is retained in a coplanar relationship with the surface of a planar display screen at an optical magnification distance from the display screen in the viewing path between the computer operator and the display screen. The optical magnification increases the size of the image on the display screen to a larger image apparent to the computer operator.

Figure 11:
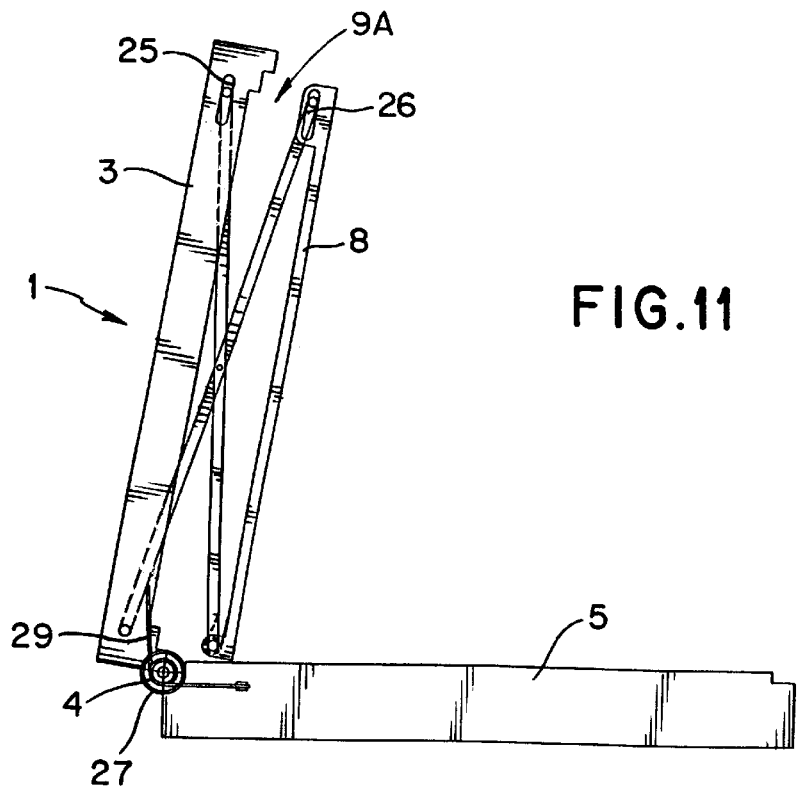

Referring to FIG. 11 the invention is illustrated as applied to a notebook computer 1 having a liquid crystal display screen 2 mounted in a cover 3 that is hinged at 4 on a keyboard 5 base. The liquid crystal display technology requires that there be a border region 6 surrounding the edges of the display screen 2 that occupies a significant portion of the available display area.

In accordance with the invention a magnifying member 7 is provided that is supported and retained by a frame 8 in a coplanar relationship with the surface of the display screen 2 at an optical magnification distance in the viewing path between the computer operator when facing the display screen 2 across the keyboard base 5, when the display screen 2 is positioned essentially vertical with respect to the keyboard base 5.

A mechanism is provided, labelled generally as element 9, and which will be described in detail in later figures, for positioning and maintaining the lens 7 and frame 8 images of the display formed by the magnifier lens 7 and frame 8 combination, that is seen by the computer operator can be, depending on the optical distance from the display screen 2, at least as large as the full area of the display screen 2 including the border 6 and may be larger. The optical magnification distance, the distance the coplanar magnifier and display screen are to be apart is mostly governed by the optical properties of the magnifier and the viewing distance for the operator. In general, a distance from the display screen 2 to the lens 7 of about two inches will allow operator head movement and still provided an inch on each side of larger apparent image.

Referring to FIG. 2 a preferred lens 7 member is illustrated in a side view. There is a type of optical magnifier known as a fresnel lens that has a transparent backing 10 with a periodic pattern of optical thickness change elements 11 which may be embossed ridges or grooves The fresnel type lens has the advantages of providing magnification over a fairly wide range of viewing path lengths and direction as may occur with operator head movement, the magnification is relatively uniform over the area of the display screen 2, it is uniformly thin, and, since the fresnel type lens adapts readily to plastic molding it is light and usually economical.

Referring to FIG. 3 a perspective larger scale view is shown of the relative positioning of the elements of the invention. In FIG. 3 the display screen 2 is surrounded by the border 6 and is located in the cover 3. The magnifier support frame 8 retains the lens 7 that is shown as a cutout of a portion of a fresnel lens with the transparent backing 10 including thickness elements 11. The mechanism 9, a portion of which is shown, positions and retains in coplanar relationship with the screen 2, the lens 7 and frame 8 combination at the magnification distance.

Referring to FIG. 4 in combination with FIGS. 1, and 3 wherein the same reference numerals for the parts are used, there is shown a side view of one of two collapsible crossed link supporting assemblies that retain the lens 7 frame 8 combination in a coplanar relationship with and spaced from the display screen 2 as the cover 3 is moved in use.

The mechanism 9 is made up of two, 9A and 9B, collapsible, center scissor hinged, cross link assemblies, one for each side of the lens 7 retaining frame, only one 9A of which is visible in this figure. The assembly 9A has a first link 20 and a second link 21 that cross and are rotatably hinged at a scissor type joint 22.

Provision is made for a pivot type joint 23 at link 21 at the bottom of the frame B3 as viewed by the computer operator and a pivot type joint 24 for link 20 at the portion of the cover 3 adjacent the hinge 4. Provision is also made for sliding pin type joints at the top of the lens 7 frame 8 assembly in which there is slider joint 25 for link 21 and slider joint 26 for link 20. The provision for the joints can be made by providing a tab with a pin accomodating hole and a tab with a pin sliding slot on the bottom and top corners respectively of the frame 8 as viewed by the computer operator and by further providing a bottom pin accommodating hole and a pin sliding top slot in the cover 3. A first spiral torsion spring 27 is positioned at the hinge 4 with one end 28 entering a hole in the base 5 and the other end 29 in contact with limit 20 urging link 20 in the direction of the cover 3. A second torsion spring 30 surrounds the pivot type joint 23 and urges link 21 in the direction of the cover 3.

Figure 5:
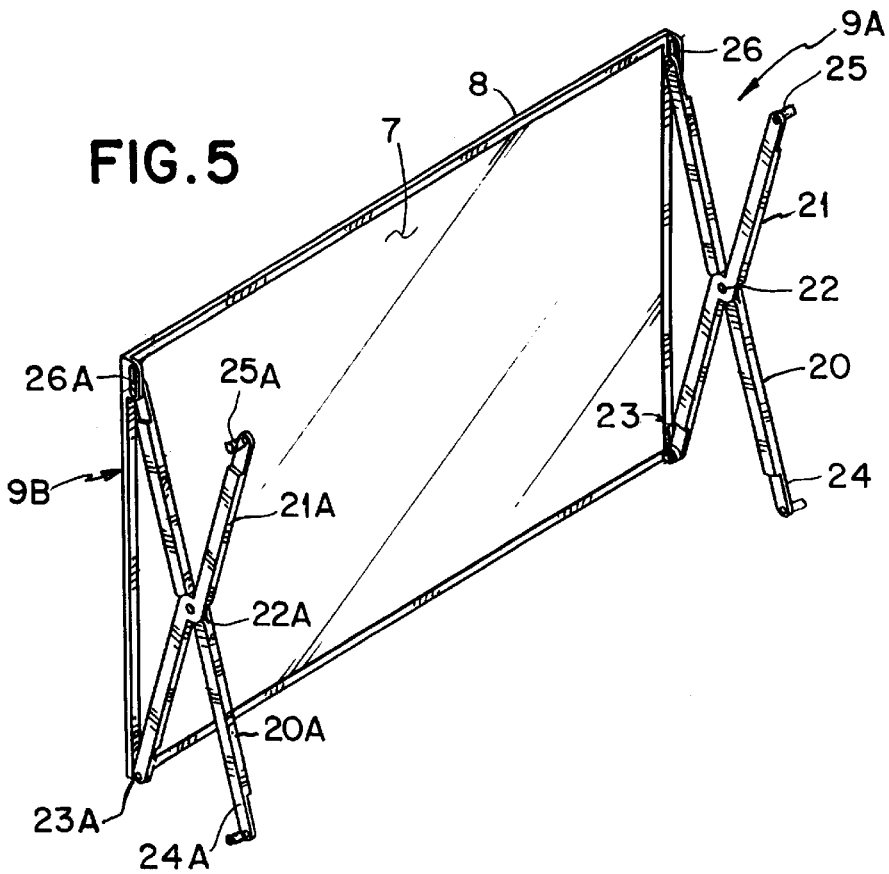
FIG. 5 is a rear perspective view of the magnifier mounting mechanism for a portable computer display screen.

The second of the two collapsible center scissor hinged cross link assemblies 9B that in combination make up the mechanism 9 and which is out of sight in FIG. 4 has identical parts and functions with reversed pin directions The counterpart parts are labelled with the suffix A in FIG. 5 and subsequent figures.

Referring to FIG. 5 in combination with the previously described figures, a rear perspective view is shown of the lens 7 frame B combination with both 9A and 9B assemblies of the mechanism 9 in view. The pins that form joints 23–26 are reversed in the parts labelled with the suffix A in the assembly 9B.

Figure 6:
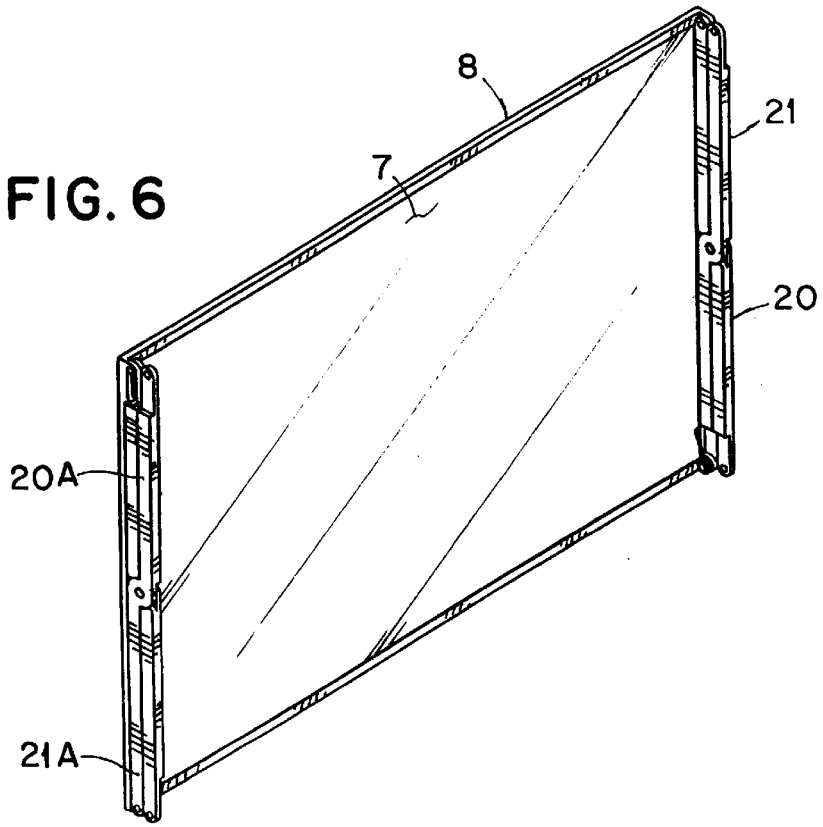
FIG. 6 is a rear perspective view of the magnifier mounting mechanism for a portable computer display screen with the mechanism in the fully collapsed position.

Referring to FIG. 6 in combination with the previously described figures, a rear perspective view is shown of the lens 7 frame 8 combination with both 9A and 9B assemblies of the mechanism 9 in view and with the 9A and 9B assemblies fully collapsed. In the fully collapsed position the link pairs 20 and 21 and 20A and 21A have rotated on the scissor type joints 22 and 22A into overlapping position thereby occupying a narrow volume space along each side of the lens 7 frame 8 combination. When the portable computer is in the closed position where the cover 3 is folded over at hinge 4 and resting on the base 5, the liners occupy a groove in the cover 3. This is partially visible with respect to linkers 20 and 21 in FIG. 3 where the link 20 extends into groove 31 between the cover 3 and the border 6 of screen 2. A similar situation exists on the other side of the frame 8 for the lines 20A and 21A.

In operation, a magnifier mechanism is provided that is completely passive to the computer operator that will compress into the cover when closed and will open into coplanar position when the cover is opened.

The operation, referring principally to FIG. 4, 5, and 6, when the cover 3 is opened to beyond about a 75 degree angle with the base 5 the frame 8 is clear of the base 5 and the springs 27 and 27A and 30 and 30A urge the link combinations 20 and 21 and 20A and 21A in directions that position the lens 7 frame 8 combination in separated coplanar position in the viewing path between the screen 2 and the computer cooperator. The length of the slots in the sliding joints 25 and 26 and 25A and 26A determine the separation and amount of magnification. When the travel of the pins in the sliding joints reach the end of the travel in the slots, the position of the lens 7 frame 8 then remains constant, as further opening of the portable computer cover 3 takes place.

It is useful in service for the personal computer to be able to accommodate conventional open and closed conditions and additionally for the computer operator to be able to have head movement and some position flexibility.

The accommodating of variations in computer deployment and position is illustrated in connection with FIGS. 7 to 12 wherein in FIGS. 7 and 6 the positions of open with the screen at 90 degrees to the base and fully closed are shown and in FIGS. 9–12 progressive views of increasing amounts of screen opening are shown.

Figure 7:
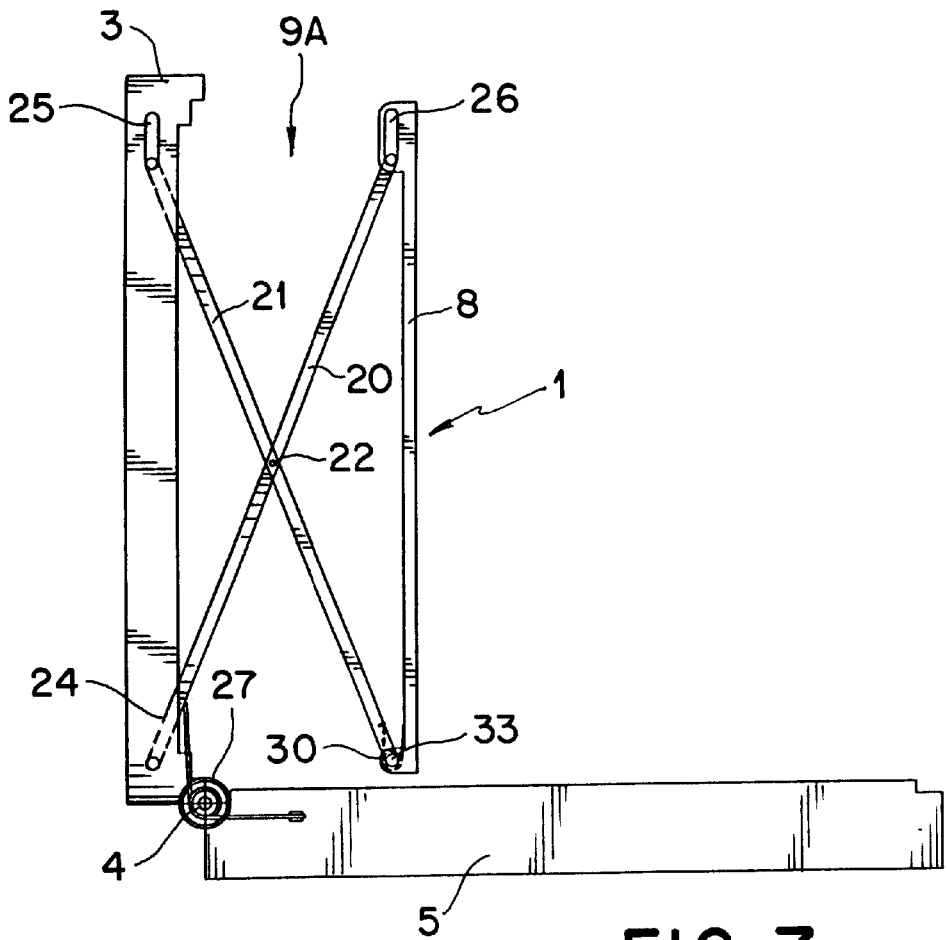
FIG. 7 is a schematic side view of the magnifier mounting mechanism for a portable computer display screen illustrating the relative positions of the pin, slots link and springs in the open position.

Referring to FIG. 7 in a side view wherein one assembly 9A is visible, the computer 1 is shown with the cover 3 opened to about perpendicular with the base 5. In this position the pins in the sliding joints 25 and 26 have been urged by springs 27 and 30 forces on links 20 and 21 to reach the end of the travel in their respective slots thereby placing frame 8 supporting the lens 7, not visible in this figures coplanar with the screen 2 in the cover 3, at the designed distance.

Figure 8:
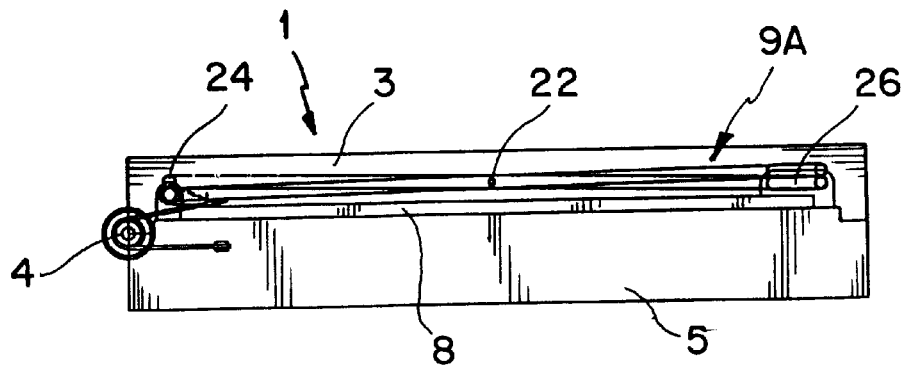

Referring to FIG. 8 the assembly 9A of the portable computer 1 is shown in a side cutaway view in the fully closed position. As the cover closes the lens 7 frame 8 combination rests con the keyboard and the assemblies 9A and 9 B collapse to where the links 20 and 21 have rotated at joint 22 into superimposed position and the pin in the sliding joint 26 is at or near the composite full travel to that of the position of the opening of the computer in FIG. 7.

In FIGS. 9–12 the movement of the mechanism 9 is shown in cutout side views as the cover 3 is opened from the closed position shown in FIG. 8 through about 105 degrees.

Figure 9:
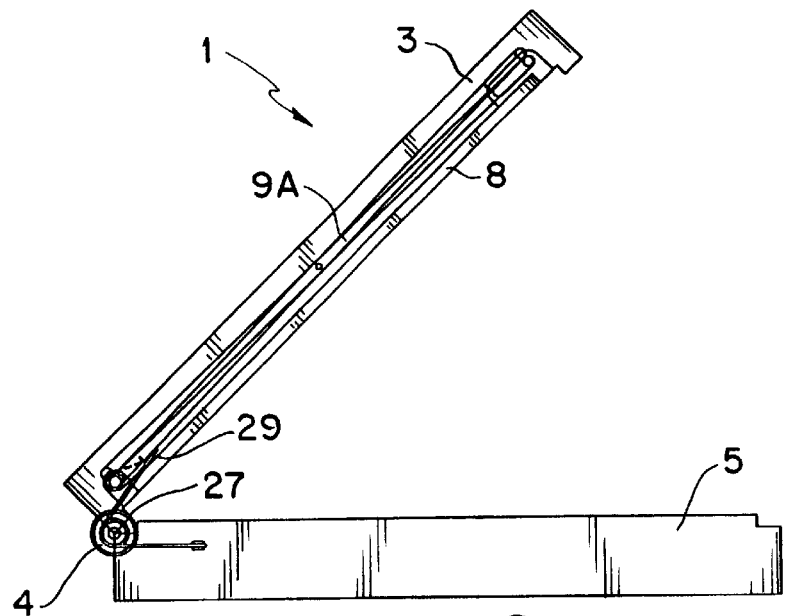
Figure 10:
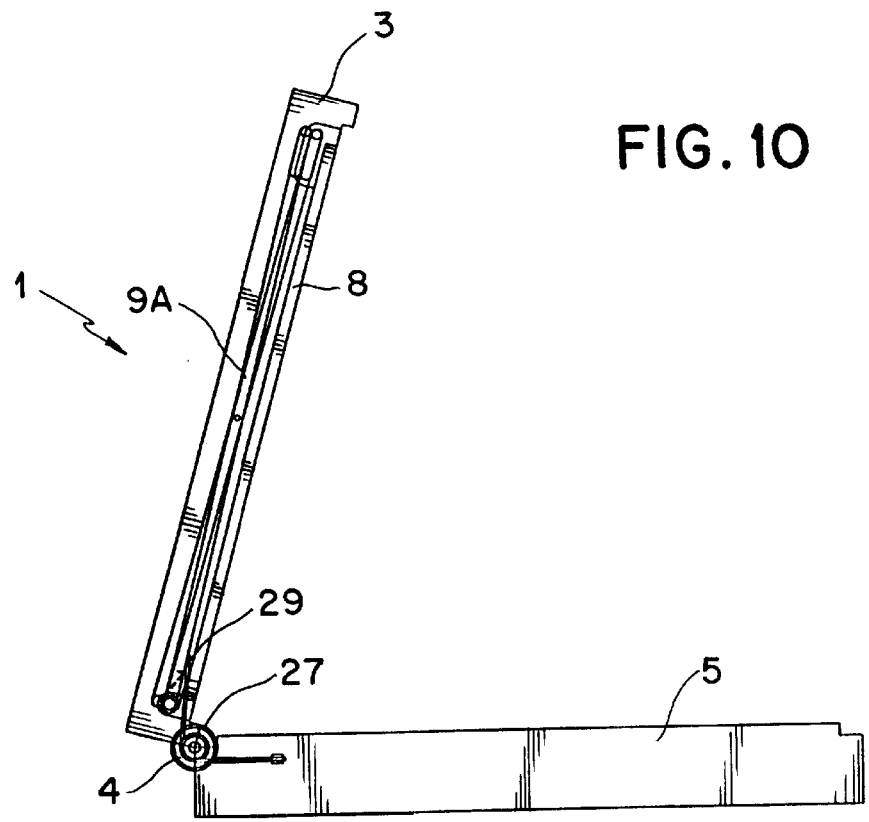
Figure 12:
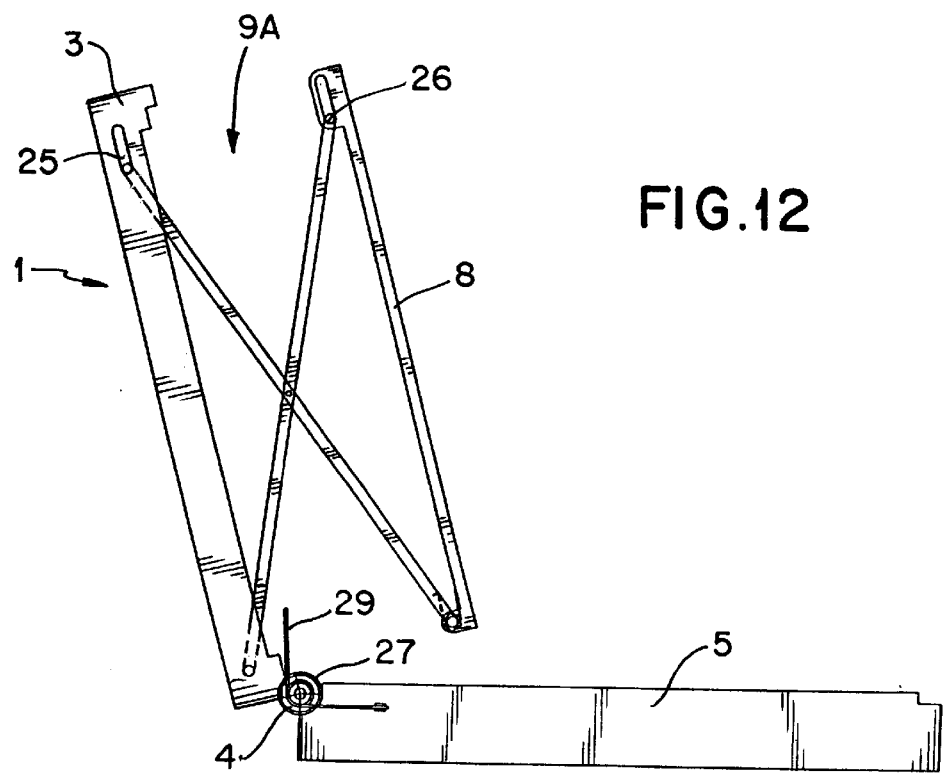

Referring serially to FIGS. 9–12. In FIG. 9, the cover 3 of the computer 1 is at about 45 degrees with the portion 29 of the spring 27 keeping the assembly 9A in the collapsed position in the cover 3. In FIG. 10, the cover 3 of the computer 1 is now open to about 75 degrees. The tension provided by the spring 27 at the portion 29 continues to provide sufficient force for keeping the assembly 9A in the collapsed position in the cover 3. In FIG. 11, the cover 3 of the computer 1 has now been opened to about 81 degrees. The tension provided by the spring 27 at the portion 29 is no longer able to keep the assemblies 9A and 9B in the fully collapsed position and the slider joints 25 and 26 are in movement to permit the spacing between the screen 2 out of sight and the frame 8 to be established. In FIG. 12, the cover 3 of the computer 1 is now open to about 105 degrees which is about as much travel as needed for typical use. The tension provided by the spring 27 at the portion 29 is designed to end as the cover 3 continues to move on the hinge 4. When the travel of the slider joints 25 and 26 comes to an end the assemblies 9A, and 9B not shown, seep the frame 8 coplanar with the screen, not visible, as the cover movement continues.

In practicing the invention changes and substitutions will be apparent within the principle of the invention such as using heads on the pins in the holes and slots and mounting the springs at a different portion of the assemblies such as the the joint 22.

What has been described is a magnification principle for a flat screen computer wherein a flat lens permits the apparent image to be larger than that of the actual displayed image.

What is claimed is:

1. In a notebook type portable computer having a display screen part that is moveably attached to a keyboard base part and which base part is positioned during operation of the computer, in a range of positions above the keyboard that are in the vicinity of the perpendicular, and which display screen part folds over the keyboard in a storage position the improvement comprising:

an essentially flat lens member with moveable positioning capability that is responsive to movement of said display screen part, said lens member positioning varying from being between said display part and said keyboard when said display screen part is in said storage position, to being in a coplanar position separated from said display screen by an optical enhancement distance when said display screen part is positioned in said range of positions that is in the vicinity of perpendicular, and, said moveable positioning capability for said flat lens being provided by a supporting frame, said supporting frame being retained in relation to said display part with parallel scissor assemblies of cross members, wherein each said cross member is joined to at least one of said frame and said display screen part by a pin at one end and by a slidable connection at the other end, each said slidable connection having a travel distance between first and second travel stops whereby, in movement of said display screen part said lens member is positioned at said optical enhancement distance when said slideable connection is at said first travel stop, and said lens member is retained at said optical enhancement distance when said slideable connection is at said second travel stop.

2. The notebook type portable computer of claim 1 wherein said lens is of the fresnel type.

3. The notebook portable computer of claim 1 wherein said display part has a border that limits the actual image on said display part and said lens is of a size that provides an apparent image that is at least as large as said display part including said border.

4. A portable computer of the notebook type wherein a display screen part having a border that limits the image area of said display screen part, is hinged on, can move through a range to near vertical for viewing, and can be folded over a keyboard part for storage, the improvement for providing a self deploying display image that is larger than said image area that is limited by said border of said display screen part comprising:

means for positioning a magnifying member at a selectable location in the viewing path of a computer operator viewing said display part, said positioning varying from, being between said display part and said keyboard when said display screen part is in said storage position, to being coplanar with said display screen part at an optical enhancement distance from said display screen part when said display screen part is positioned in said range that is near vertical for viewing, and, said means for positioning including a lens supporting frame with parallel scissor cross leg member assemblies that retain said frame in coplanar relationship with said display screen part and wherein each said leg member of said assemblies is attached to one side of said frame within a pin connection and is attached to the remaining side of said frame with a slideable connection, each said slidable connection having a travel distance between first and second travel stops whereby, in movement of said display screen part said lens member is positioned at said optical enhancement distance when said slideable connection is at said first travel stop, and said lens member is retained at said optical enhancement distance when said slideable connection is at said second travel stop.

5. The improvement of claim 4 wherein said flat magnifying member is a fresnel type lens.

* * * * *